United States Patent [19]

Favre et al.

[11] Patent Number: 5,008,013
[45] Date of Patent: Apr. 16, 1991

[54] FILTER FOR USE IN A CARTRIDGE FOR THE PREPARATION OF A BEVERAGE

[75] Inventors: Eric Favre, Saint-Barthelemy; Petr Masek, Yverdon; Bernard Truchement, La Tour-de-Peilz, all of Switzerland

[73] Assignee: Nestec S.A., Vevey, Switzerland

[21] Appl. No.: 245,755

[22] Filed: Sep. 16, 1988

[30] Foreign Application Priority Data

Oct. 1, 1987 [CH] Switzerland ............... 3815/87

[51] Int. Cl.$^5$ ............... A47J 31/00; B01D 39/10
[52] U.S. Cl. ............... 210/482; 210/498; 99/295
[58] Field of Search ............... 210/477, 482, 483, 498; 99/295, 287, 289 P, 298, 302 R, 306, 312

[56] References Cited

U.S. PATENT DOCUMENTS

| | | | |
|---|---|---|---|
| 1,306,415 | 6/1919 | Dunlap | 210/477 |
| 1,905,350 | 7/1932 | Page | 210/477 |
| 2,936,695 | 5/1960 | Donot | 99/295 |
| 3,292,527 | 12/1966 | Stasse | 99/302 R |
| 4,136,202 | 7/1979 | Favre | 99/295 |
| 4,740,303 | 4/1988 | Greutert et al. | 210/497.01 |

FOREIGN PATENT DOCUMENTS 605293 12/1977 Switzerland .

OTHER PUBLICATIONS

Translation of Swiss Patent No. CH 605,293.

Primary Examiner—W. Gary Jones
Assistant Examiner—Matthew O. Savage
Attorney, Agent, or Firm—Vogt & O'Donnell

[57] ABSTRACT

A filter employed for the extraction of beverages is formed of a piece of material having two planar surfaces and a plurality of uniformly distributed openings extending through the piece. A plurality of nipples, equal in number to the number of openings, project from and out of at least one of the planar surfaces and extend for a distance substantially equal to the thickness between the planar surfaces of the piece of material, each nipple being associated with one of the openings through the piece of material, and each opening extends through each nipple. The openings have a shape of a truncated cone, a truncated pyramid, or a truncated tetrahedron, and each opening at the end of each nipple, which is disposed away from the planar surface from which the nipple projects, forms a minor base of the opening shape and each opening at the other planar surface forms a major base of the opening shape.

19 Claims, 3 Drawing Sheets

FILTER FOR USE IN A CARTRIDGE FOR THE PREPARATION OF A BEVERAGE

BACKGROUND OF THE INVENTION

This invention relates to a filter suitable for use in a cartridge for the preparation of a beverage and to the cartridge provided with this filter.

Swiss patent 605 293 relates to a cartridge for the preparation of a beverage, particularly espresso coffee, consisting of a fluid-tight body generally frustoconical in shape with a border at its base, a membrane closing the base and a filter adjacent the membrane.

The filter used is a 0.04 to 0.06 mm mesh screen of polypropylene. This filter has a number of disadvantages which make it far from attractive. Its weldability is not good. It shows poor mechanical strength during extraction of the cartridge, being deformed or tearing at the edges under the effect of a pressure of up to 15 bar. It presents crimping problems during production of the cartridge. That is, the edges are not completely fluid-tight, thus posing problems affecting the keeping properties of the coffee due to the entry of oxygen into the cartridge. Finally, the quality of the coffee obtained is not satisfactory, in that, the extraction level of the coffee is not optimized, nor is the quality of the froth typical of espresso coffee.

SUMMARY OF THE INVENTION

The object of the present invention is to provide lovers of beverages, particularly espresso coffee, with a filter suitable for use in a cartridge which does not have any of the disadvantages mentioned above. The invention relates to a filter which is suitable for use in a cartridge for the preparation of a beverage and which comprises uniformly distributed openings of the same size, each in the shape of a truncated cone, truncated pyramid, or truncated tetrahedron. The filter employed for the extraction of beverages is formed of a single planar sheet, of material including two planar surfaces and having a plurality of uniformly distributed openings extending through the piece. A plurality of nipples, equal in number to the number of openings, project from and out of at least one of the planar surfaces and extend for a distance substantially equal to the thickness between the planar surfaces of the piece of material, each nipple being associated with one of the openings through the piece, and each opening extends through each nipple. The openings have a shape of a truncated cone, a truncated pyramid, or a truncated tetrahedron, and each opening at the end of each nipple disposed away from the planar surface from which the nipple projects forms a minor base of the shape and the opening at the other planar surface forms a major base of the shape.

In the embodiment where the openings are frustoconical, the diameter of the minor base is between 0.01 and 0.3 mm and that of the major base between 0.2 and 0.5 mm.

In the embodiment where the openings are frustopyramidal in shape, the diagonal of the square of the minor base is between 0.1 and 0.3 mm and that of the square of the major base between 0.2 and 0.5 mm.

Where the openings are in the form of an equilateral truncated tetrahedron, the sides of the triangle of the minor base are between 0.1 and 0.3 mm and those of the triangle of the major base between 0.2 and 0.5 mm.

DETAILED DESCRIPTION OF THE INVENTION

In the context of the invention, a beverage is understood to be both the beverage obtained from roasted ground coffee and that obtained from tea, mint, vervain or any other extractable aromatic substance. Generally, however, the beverage in question is expressso coffee.

In the filter according to the invention, each opening comprises at its minor base end a nipple which is substantially equal in height to the thickness of the filter. This thickness of the filter is normally between 0.2 and 0.6 mm and preferably between 0.3 and 0.4 mm.

The material used for the filter is a metal, preferably aluminium coated with a heat-sealing lacquer, nickel, or a plastics material compatible with foods, capable of withstanding temperatures of 100° C. and pressures of 15 bar.

The filter according to the invention is circular in shape with a diameter of from 20 to 50 mm and preferably of about 30 mm. It comprises between 70 and 200 openings and preferably between 80 and 90 openings. In the more specific frustoconical embodiment, each opening has a minor base 0.2 mm in diameter and a major base 0.3 mm or 0.45 mm in diameter.

The invention also relates to the cartridge for the preparation of a beverage comprising the filter described above. By cartridge is meant both the cartridge according to Swiss patent CH-PS 605 293 and any other type of cartridge having a filter.

The cartridges disclosed and described in Swiss Patent 605 293 have a body which includes a summit capable of being pierced by an injector and a base. The base includes a membrane which closes the base and which is provided with a tear-line. As disclosed and described, a filter is positioned within the cartridge adjacent the membrane and separates the membrane from the substance to be extracted. Under pressure during extraction, the membrane expands and finally breaks along the tear-line thereby forming a pinhole through which a beverage extracted from the substance may flow from the cartridge through the filter. The cartridge has a general shape of an acute truncated cone.

The filter is disposed in the cartridge so that the surface with the nipples faces the substance to be extracted. In the case of a cartridge containing ground coffee, the conicity of the openings provides for the formation of a longer lasting froth on the espresso coffee obtained. The presence of the nipples opposite the coffee is desirable because they prevent the filter from becoming clogged by the grains of ground coffee or by the fines.

However, it is also possible to have a filter of which approximately half the openings have nipples on the coffee side and the other half nipples on the side opposite the coffee. A filter having all the nipples on the side opposite the coffee may also be envisaged.

BRIEF DESCRIPTION OF THE DRAWING

The invention is described in more detail with reference to the accompanying drawings.

DETAILED DESCRIPTION OF THE DRAWINGS

Figure 1:
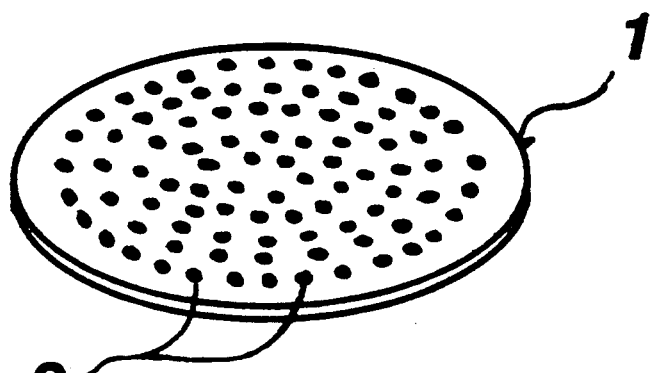
FIG. 1 is a plan view of the filter according to the invention.
Figure 2:
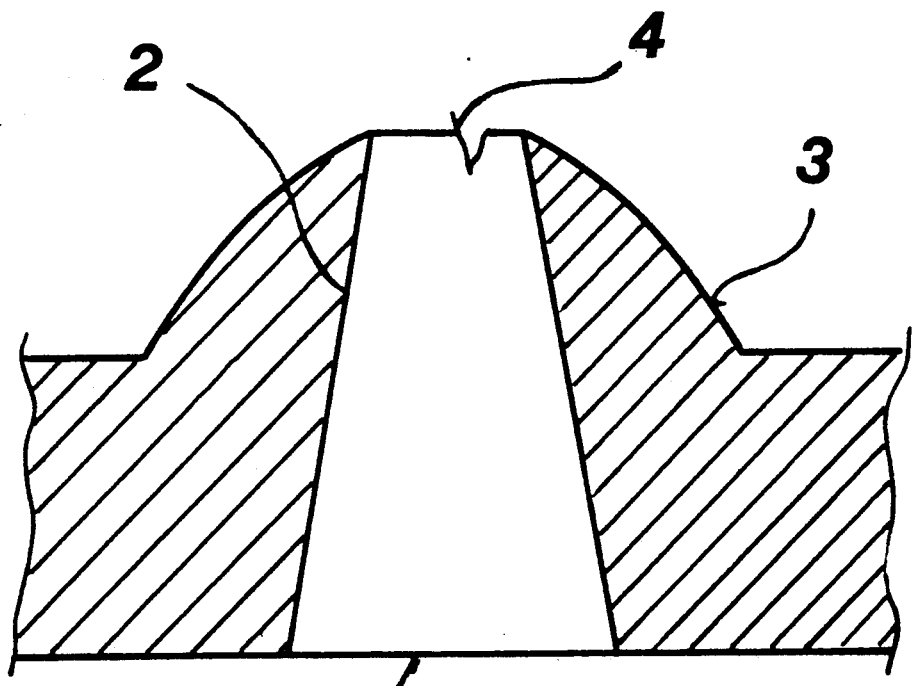
FIG. 2 is a section through an opening in a shape of a truncated cone enlarged 100 times.

The filter (1) is made of aluminium and, in the embodiment shown in FIG. 1, comprises 87 openings (2). These openings (2) are shown in more detail in FIG. 2. As shown in FIG. 2, the minor base (4) has a diameter of 0.2 mm and the major base (5) a diameter of 0.3 mm. The nipple (3) has a height of 0.3 mm. The thickness of the filter is 0.4 mm.

Figure 3:
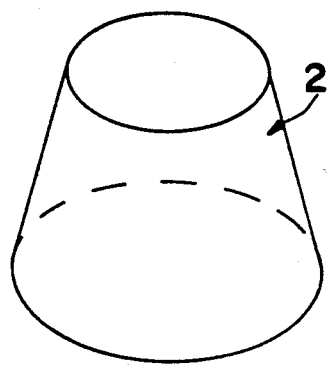
FIGS. 3-5 are views of openings of the filter of the present invention having, respectively, a frusto-conical shape, a frustopyramidal shape and a truncated tetrahedral shape.
Figure 4:
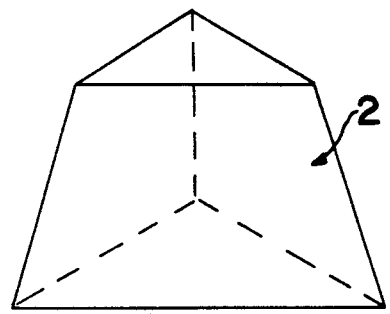
Figure 5:
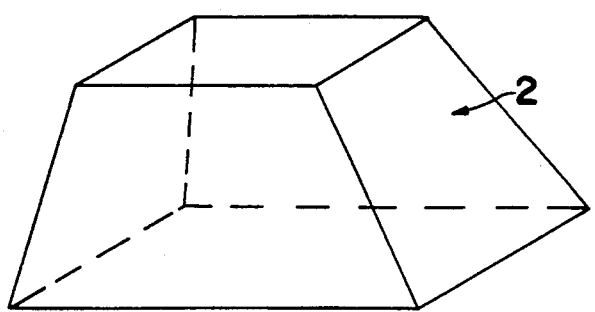

FIGS. 3–5 show differing shapes of openings (2), those being a frusticonical shape (FIG. 3), a frustopyramidal shape (FIG. 4) and a truncated tetrahedral shape (FIG. 5).

Figure 6:
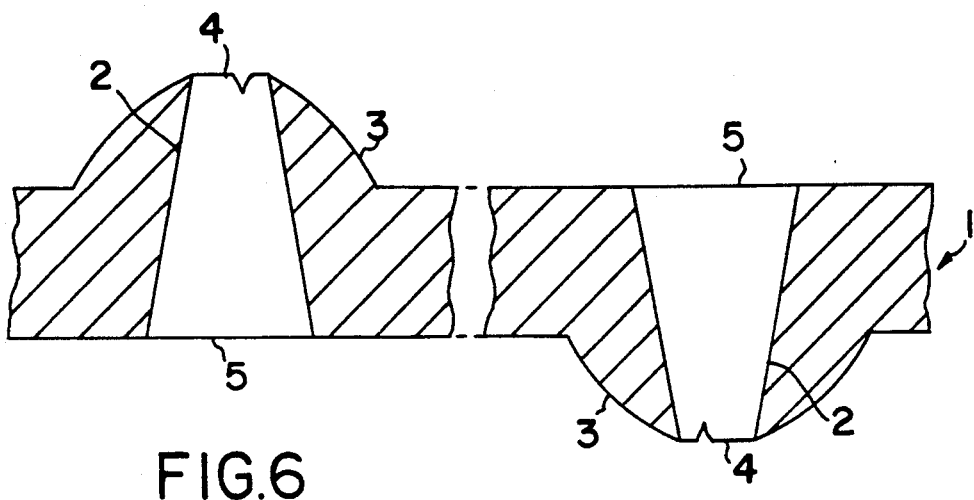
FIG. 6 is a partial side view of a filter wherein some nipples project from each planar surface of the single planar sheet comprising the filter.

FIG. 6 shows a side view of filter (1) wherein nipples (3) extend from each planar surface of the single planar sheet comprising the filter (1).

The filter according to the present invention provides the consumer with a cartridge of coffee with which it is possible to prepare a beverage effectively combining the properties of a good espresso coffee, namely an unctuous froth, a lasting taste of coffee and good extractability of the coffee.

Figure 7:
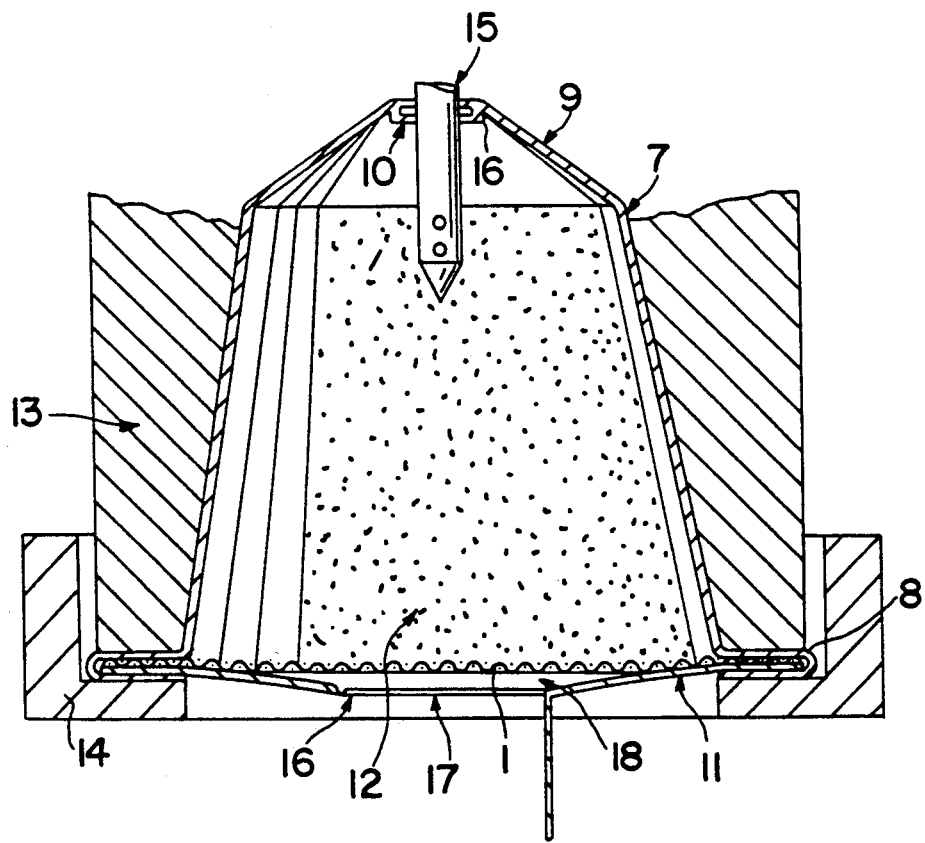
FIG. 7 depicts a cartridge as disclosed in Swiss Patent 605 293 in which the filter of the present invention is suitable for use.

In the drawing FIG. 7, the cartridge is formed by a body (7) of aluminum sheetmetal of a thickness of 60 to 110 μm, preferably 80 μm, having the general form of an acute truncated cone with an edging (8) at the base. The conicity relative to the axis is 2 to 20°, preferably about 10° (or a 20° angle at the apex). Thus a better resistance to crushing is obtained and the cartridge will come out of its seating more easily after use.

At its smaller end the body (7) terminates in an obtuse cone (9). As a varient, this end is dome-shaped. It presents a substantially cylindrical seating (10). In a preferred form of execution, the bottom of this seating is weakened.

The edging (8) is formed by crimping the body over a membrane (11) closing the base and, in the example represented, a filter (1) adjacent to the membrane (11). In a preferred form of execution, the body and the membrane are heat-sealed.

The membrane is of aluminum, preferably 30 to 60 μm thick. As a variant, it has radial grooves making it more easily deformable. It has a tear-line (16) formed by a stamped groove, of a round general form. In a preferred execution, this line is not closed, but C- or horseshoe-shaped.

The cartridge is filled with a substance (12) for the preparation of a beverage, ground coffee in the example represented, but it could be tea, instant coffee, a mixture of ground coffee and instant coffee, a chocolate product, etc.

In use, the cartridge is placed in the housing (13) of a machine for beverage preparation of conventional type, such as coffee machines called expresso. The cartridge is held in the housing (13) by a fastening element (14) made fast to the machine by a bayonet type device. As the conicity of the housing (13) matches that of the body (7), the tightening of the element (14) holds the cartridge well and contributes to its resistance to the internal pressure.

When the cartridge is placed in the housing (13), its summit is pierced by an injection element (15) of the machine, while a joint (16) fits into the seating (10) of the cartridge. The liquid for the preparation of the beverage is then injected under pressure by the element (15) into the cartridge and mixes with the substances (12). The pressure may be relatively high and can reach about 16 bars.

This pressure, at first, causes the membrane (11) to expand and in the end to break along the tear-line (16). Thus the full opening of a pinhole (17) of a given form is produced, through which the beverage runs evenly. It will be noted that the convexity of the membrane (11) forms under the filter (1) a collecting chamber (18) which gives an even distribution of the flow across the entire cross-section of the cartridge and of the filter (1).

When the tear-line (16) is not closed, the wall of the pinhole (17) does not completely detach from the membrane (11) and there is no risk of its falling into the cup for example.

Ultimately, the beverage flows directly through the pinhole (17) into the receiving vessel. The fastening element (14) may be simply annular, without collecting chamber or spout that would require frequent and laborious cleaning.

We claim:

1. A filter for preparation of extracted beverages comprising a single planar sheet of material including two planar surfaces having a plurality of uniformly distributed openings extending through the sheet and having a plurality of nipples, equal in number to the number of openings, projecting from and out of at least one of the planar surfaces to a nipple end disposed away from the planar surface from which the nipple projects, wherein each nipple is associated with one of the openings through the sheet, wherein each opening extends through each nipple, wherein each opening at the end of each nipple forms a minor base of an opening shape, wherein each opening at the other planar surface forms a major base of the opening shape and wherein the opening shape defined about the openings by the sheet and each nipple is a shape selected from a group of shapes consisting of
   (i) a frustoconical shape wherein the minor base opening has a diameter of between 0.1 m and 0.3 mm and the major base opening has a diameter of between 0.2 mm and 0.5 mm
   (ii) a frustopyramidal shape wherein a diagonal of a square of the minor base opening is between 0.1 mm and 0.3 mm and wherein a diagonal of a square of the major base opening is between 0.2 mm and 0.5 mm; and
   (iii) a shape in a form of an equilateral truncated tetrahedron wherein sides of a triangle of the minor base opening define an opening of between 0.1 mm and 0.3 mm and wherein sides of the major base opening define an opening of between 0.2 mm and 0.5 mm.

2. A filter according to claim 1 wherein the filter is circular in shape and has a diameter of from 20 mm to 50 mm and the filter sheet has a thickness between the planar surfaces of from 0.2 mm to 0.6 mm.

3. A filter according to claim 1 wherein the filter has from between 70 to 200 openings and nipples.

4. A filter according to claim 1 wherein some nipples project from one planar surface and other nipples extend from the other planar surface.

5. A filter according to claim 4 wherein approximately one half of the nipples project from the one surface and approximately one half of the nipples project from the other surface.

6. A filter according to claim 1 wherein the nipples project from the planar surface for a distance substantially equal to a thickness between the planar surface of the sheet.

7. In a cartridge for containing a beverage to be extracted having one filter through which the extracted beverage flows, the improvement comprising a filter comprised of a single planar sheet of material including two planar surfaces and having a plurality of uniformly distributed openings extending through the sheet and having a plurality of nipples, equal in number to the number of openings, projecting from and out of at least one of the planar surfaces to a nipple end disposed away from the planar surface from which the nipple projects, wherein each nipple is associated with one of the openings through the sheet, wherein each opening extends through each nipple and has a shape defined about the opening by the sheet and each nipple selected from a group of shapes consisting of a truncated cone, a truncated pyramid and truncated tetrahedron and wherein each opening at the end of each nipple forms a minor base of the opening shape and wherein each opening at the other planar surface forms a major base opening of the opening shape.

8. In a cartridge having a body which includes a summit capable of being pierced by an injector, a base having a membrane provided with a tear-line, such that during extraction the membrane expands and finally breaks along the tear-line thereby forming a pinhole through which a beverage extracted from the substance may flow, and a filter positioned within the cartridge adjacent the membrane separating the membrane from the substance to be extracted and through which the extracted beverage may flow, the improvement comprising one filter comprised of a single planar sheet of material including two planar surfaces and having a plurality of uniformly distributed openings extending through the sheet and having a plurality of nipples, equal in number to the number of openings, projecting from and out of at least one of the planar surfaces to a nipple end disposed away from the planar surface from which the nipple projects, wherein each nipple is associated with one of the openings through the sheet, wherein each opening extends through each nipple and has a shape defined about the opening by the sheet and each nipple selected from a group of shapes consisting of a truncated cone, a truncated pyramid and a truncated tetrahedrom and wherein each opening at the end of each nipple forms a minor base of the opening shape and wherein each opening at the other planar surface forms a major base of the opening shape.

9. A cartridge according to claim 7 or 8 wherein the filter is capable of withstanding temperatures of 100° C. and pressures of 15 bar.

10. A cartridge according to claim 7 or 8 wherein the filter is comprised of aluminum.

11. A cartridge according to claim 7 or 8 wherein each nipple faces the substance to be extracted.

12. A cartridge according to claim 7 or 8 wherein the filter opening shape is frustoconical and the minor base opening has a diameter of between 0.1 mm and 0.3 mm and the major base opening has a diameter of between 0.2 mm and 0.5 mm.

13. A cartridge according to claim 7 or 8 wherein the filter opening shape is frustopyramidal and wherein a diagonal of a square of the minor base opening is between 0.1 mm and 0.3 mm and wherein a diagonal of a square of the major base opening is between 0.2 mm and 0.5 mm.

14. A cartridge according to claim 7 or 8 wherein the filter opening shape is in a form of an equilateral truncated tetrahedron and wherein sides of a triangle of the minor base opening define an opening of between 0.1 mm and 0.3 mm and wherein sides of the major base opening define an opening of between 0.2 mm and 0.5 mm.

15. A cartridge according to claim 7 or 8 wherein the filter is circular in shape and has a diameter of from 20 mm to 50 mm and the filter sheet has a thickness between the planar surface of from 0.2 mm to 0.6 mm.

16. A cartridge according to claim 7 or 8 wherein the filter has from between 70 to 200 openings and nipples.

17. A cartridge according to claim 7 or 8 wherein the nipples project from the planar surface for a distance substantially equal to a thickness between the planar surfaces of the sheet.

18. A filter according to claim 7 or 8 wherein some nipples project from one planar surface and other nipples project from the other planar surface.

19. A filter according to claim 7 or 8 wherein approximately one half of the nipples project from the one surface and approximately one half of the nipples project from the other surface.

* * * * *

UNITED STATES PATENT AND TRADEMARK OFFICE
CERTIFICATE OF CORRECTION

PATENT NO. : 5,008,013

DATED : April 16, 1991

INVENTOR(S) : Eric Favre, et al

It is certified that error appears in the above-identified patent and that said Letters Patent is hereby corrected as shown below:

Column 2, between lines 57 and 58, "Drawing" should be --DRAWINGS--.

Column 2, line 60, the colon should be a period.

Column 4, line 3, "(16)" should be --(20)--.

Column 5, line 7 (line 3 of claim 6) "surface" should be --surfaces--.

Figure 7 should be deleted, to appear as per the attached page.

Signed and Sealed this

Sixth Day of October, 1992

*Attest:*

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 5,008,013

DATED : April 16, 1991

INVENTOR(S) : Eric Favre, et al

It is certified that error appears in the above-identified patent and that said Letters Patent is hereby corrected as shown below:

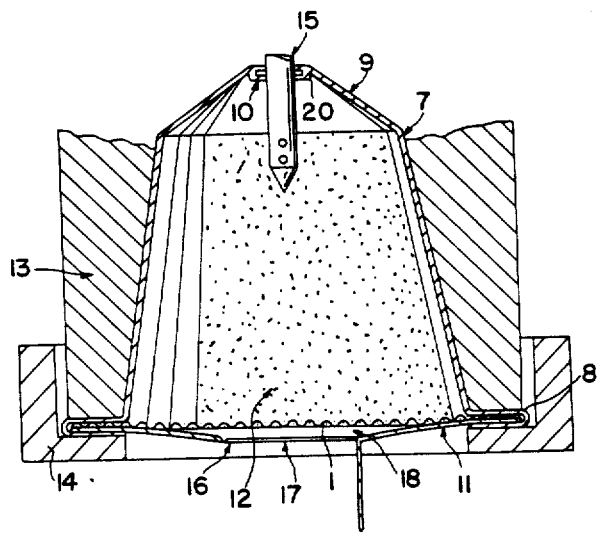

FIG.7